US 6,481,636 B2

(12) United States Patent
Herta

(10) Patent No.: US 6,481,636 B2
(45) Date of Patent: Nov. 19, 2002

(54) ARRANGEMENT FOR HEATING OF A MOTOR VEHICLE INTERIOR

(75) Inventor: Magnus Herta, Olching (DE)

(73) Assignee: Webasto Thermosysteme International GmbH, Stockdorf (DE)

( * ) Notice: Subject to any disclaimer, the term of this patent is extended or adjusted under 35 U.S.C. 154(b) by 0 days.

(21) Appl. No.: 09/725,455

(22) Filed: Nov. 30, 2000

(65) Prior Publication Data

US 2001/0016472 A1 Aug. 23, 2001

(30) Foreign Application Priority Data

Nov. 30, 1999 (DE) .......................................... 199 57 629

(51) Int. Cl.$^7$ ................................................ B60H 1/02
(52) U.S. Cl. ........................ 237/12.3 A; 165/41; 165/42
(58) Field of Search ...................... 237/12.3 A, 12.3 B, 237/12.3 R; 454/160; 165/42, 41

(56) References Cited

U.S. PATENT DOCUMENTS 3,646,875 A * 3/1972 Zenkner ..................... 454/160
3,696,730 A * 10/1972 Masuda et al. ............. 454/160
5,109,755 A * 5/1992 Guillemen .................. 454/160
5,443,208 A * 8/1995 Potter ...................... 237/12.3 A
5,476,138 A * 12/1995 Iwasaki et al. ................ 165/41
5,687,790 A * 11/1997 Trame et al. .................. 165/42

FOREIGN PATENT DOCUMENTS

DE          196 50 941          6/1998

* cited by examiner

Primary Examiner—Harold Joyce
Assistant Examiner—Derek S. Boles
(74) Attorney, Agent, or Firm—Nixon Peabody LLP; David S. Safran

(57) ABSTRACT

An arrangement for heating a motor vehicle interior, especially a truck driver's compartment, a bus interior or the passenger compartment of a passenger car, with a ventilation device (10) for taking in fresh air via a fresh air intake area and for discharging air into the motor vehicle interior, with a heating device (11) for heating of air, and with a warm air line (25) for routing the air which has been heated by the heating device (11) into the ventilation device (10). The warm air line (25) is routed into the fresh air intake area such that the heated air emerging from the warm air line (25) is taken in jointly with the fresh air into the ventilation device (10).

8 Claims, 3 Drawing Sheets

ARRANGEMENT FOR HEATING OF A MOTOR VEHICLE INTERIOR

BACKGROUND OF THE INVENTION

1. Field of the Invention

The invention relates to an arrangement for heating a motor vehicle interior, especially a truck driver's compartment, a bus interior or the passenger compartment of a passenger car, with a ventilation means for taking in fresh air via a fresh air intake area and discharging air into the interior, with a heating device for heating of air, and with a warm air line for routing air heated by the heating device into the ventilation means.

2. Description of Related Art

In conventional arrangements of the type to which the invention is directed, the heating device with its warm air line is directly connected to the ventilation means, i.e., the air supplied by the heating device comes into direct contact with the material comprising the individual parts of the ventilation means, so that heatproof material must be used because the warm air supplied by the heating device typically has a temperature between 120° and 130° C. Nevertheless, there is the danger that the exposed components, typically plastic parts of the ventilation means, can burst or melt due to such a high thermal load. This applies fundamentally also to a frozen windshield which can break due to the high temperature difference between the heating air and the outside air temperature. These problems are, in any case, mitigated by the corresponding addition of fresh air. However, the disadvantage is that in such a known arrangement, as a result of the necessity of having to use heatproof material, the production costs of the arrangement are relatively high. For this arrangement, a heating device is needed which can make available a relatively high volumetric flow in order to be able to overcome the resistances within the ventilation means. This results in high power consumption of the heating device and a high noise level due to flow noise in the ventilation means.

Published German Patent Application DE 196 50 941 A1 discloses a heating and air conditioning device for motor vehicles in which the air emerging from the warm air line is routed into the pressure-side of the fan mixing or distribution space.

SUMMARY OF THE INVENTION

In view of this prior art, it is an object of this invention to devise an arrangement of the initially mentioned type which can be economically produced and can be economically operated in the area of the ventilation means, and which offers a high level of comfort as a result of the low noise level.

This object is achieved by the warm air line being routed into the fresh air intake area such that the heated air emerging from the warm air line is taken in jointly with the fresh air into the ventilation means Instead of indirect delivery of heating air into the ventilation means, the invention takes a completely novel approach by avoiding exposure of the components of the ventilation means to the hot air which is delivered to the ventilation by means of the fresh air taken in. In this way, on the one hand, this results in that by mixing the warm air which is made available by the heating device with cold fresh air its temperature is lowered to a temperature level which is not harmful to the material of the components of the ventilation means itself, if only heat-resistant and not heatproof material is used for this purpose, i.e., material which is typically heat resistant up to roughly 60° C. The cost advantages of using the corresponding plastic material are readily apparent. On the other hand, the approach according to the invention results in warm air being delivered by mixing hot air into the fresh air taken in together with it by the ventilation means, so that the heating device need simply make available a volumetric flow which is sufficient to deliver warm air into the fresh air intake area. By using an air heating device with low volumetric flow, power costs are reduced while the noise level in the ventilation system can be kept moderate.

However, the arrangement according to the invention can, therefore, also be built economically because, in the simplest case, it is sufficient to allow the warm air line to end at the fresh air intake area of the ventilation means, where the warm air flow emerging from the warm air line is taken in by the heating device together with the fresh air.

By using simple means, moreover, it is possible to increase comfort in the heating of the motor vehicle interior by means of the configuration in accordance with the invention by controlling the mixing ratio between the fresh air and warm air in the fresh air intake area. Advantageously, a warm/fresh air mixing means of simple structure is considered which, for example, enables temperature setting for the hot air which has been delivered into the motor vehicle interior by changing the exit cross section of the wanr air line and/or the intake channel for the fresh air. Advantageously, in this respect, the invention calls for the mixing means to comprise a fresh air intake chamber with at least one fresh air intake opening and a warm air intake chamber into which the warm air line discharges and which is connected to the fresh air intake chamber via at least one connection opening with an adjustable opening cross section. The fresh air intake chamber can be produced from economical materials, for example, heat-resistant (but not heatproof) plastic, while the warm air intake chamber is advantageously produced from heatproof plastic material or sheet metal.

In the following, the invention is explained in detail with reference to the accompanying drawings.

DETAILED DESCRIPTION OF THE INVENTION

Figure 1:
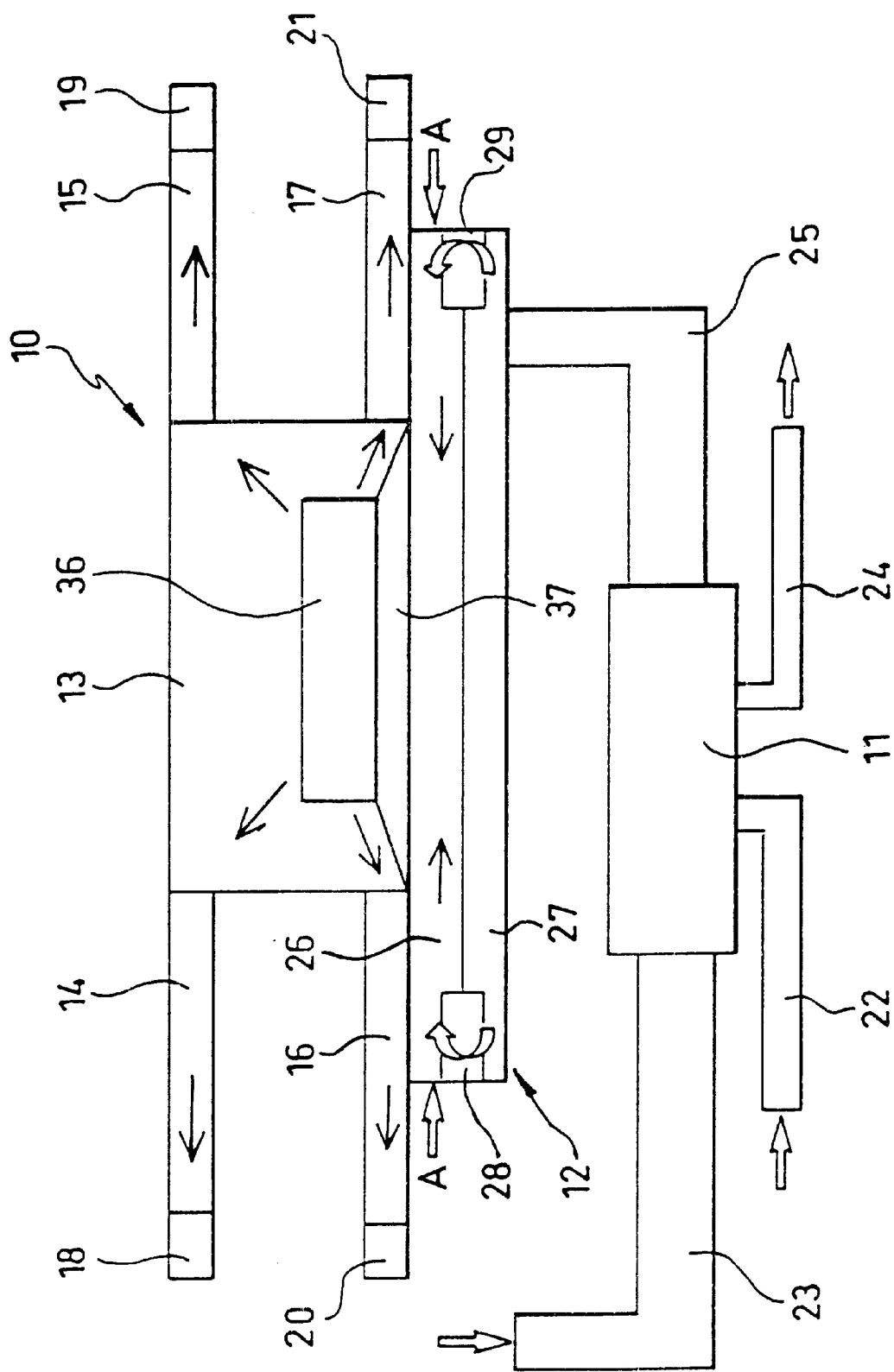
FIG. 1 schematically shows the basic structure of the arrangement in accordance with the invention for heating the motor vehicle interior.

The arrangement for heating a motor vehicle interior shown in FIG. 1 comprises a known ventilation means 10 for the motor vehicle interior, a heating device 11 for heating of air and a mixing means 12 for mixing the warm air which has been delivered by the heating device 11 with fresh air before this mixture is taken into the ventilation means 10. This arrangement is built in particular as follows.

The ventilation means 10 comprises a housing 13 in which a motor vehicle blower fan 36 is located which takes in air at the bottom of the housing 13 into an intake area 37 and delivers it via several connection channels 14, 15, 16 and 17 to discharge nozzles 18, 19, 20, and 21. Typically, the nozzles 18, 19 are located at the level of the face area of the driver and passengers and/or at the height of the bottom edge of the windshield, while the nozzles 20, 21 deliver air into the foot area of the motor vehicle interior. Also typically, the intake area at the bottom of the housing 13 is formed as a relatively large-area, open, bottom region of the housing 13.

The heating device 11 is supplied with fuel via a fuel line 22 and the fuel is mixed, in the conventional manner, in the heating device 11 with intake air which is supplied via a feed line 23 to the heating device 11 where the fuel is burned. The exhaust gas formed in the combustion process is discharged via an exhaust gas line 24. At the outlet of the heating device 11 at which heating air is available, a wanr air line 25 is connected which transfers warm air to the ventilation means 10. In an arrangement which is made according to the prior art, the warm air line 25 discharges directly into the housing of the ventilation means 10, so that this very hot air, which has a temperature that is usually between 120° and 130° C., comes directly into contact with the material of the components of the housing 13 thereby requiring that this material be produced from a heatproof substance. This defect is overcome by the invention by avoiding direct delivery of hot warm air to the ventilation means 10. Instead, the warm air from the heating device 11 is not delivered into the housing of the ventilation means 10, but simply to its bottom-side intake area, therefore emerges outside of the housing 13 from the warm air line 25 and together with the fresh air which has been taken in by the blower in the housing 13 is delivered into the ventilation means 10. Direct exposure of the components of the housing 13 of the ventilation means 10 and the other components thereof to hot air does not occur, so that a correspondingly economical material can be used for these components, specifically material which is not heatproof, but simply heat-resistant, in order to deliver the moderately warm, mixed air flow to the discharge nozzles 18 to 21.

While it is fundamentally possible to allow the warm air line 25 to end in the intake area of the ventilation means 10, preferably the mixing means 12 is connected upstream in the intake area; it is composed of a fresh air intake chamber 26 which directly follows the intake area and which is open to it, and a warm air intake chamber 27 which is located on the bottom of the fresh air chamber 26 opposite the intake area 37. On the two outside edges, the fresh air intake chamber 26 and the warm air intake chamber 27 are connected to one another via connection openings 28 and 29 with an opening cross section which can preferably be controlled. Moreover, the fresh air intake chamber 26 is open on its outside edges and these open areas are used as intake openings for fresh air, as is shown schematically by the arrows A. The warm air intake chamber 27, on the other hand, except for the connection openings 28 and 29 is closed on all sides and the warm air line 25 discharges into the warm air intake chamber 27. This configuration results in the fan 36 taking fresh air into the housing 13 via the edge-side openings of the warm air intake chamber 27, which fresh air, for its part, entrains the warm air delivered into the warm air intake chamber 27 by the heating device 11 via the warm air line 25, the mixing ratio, and thus, the temperature of the air taken into the housing 13 of the ventilation means 10 from the mixing means 12 being determined by the respective cross section of the connection openings 28, 29 between the two chambers 26, 27.

Figure 2:
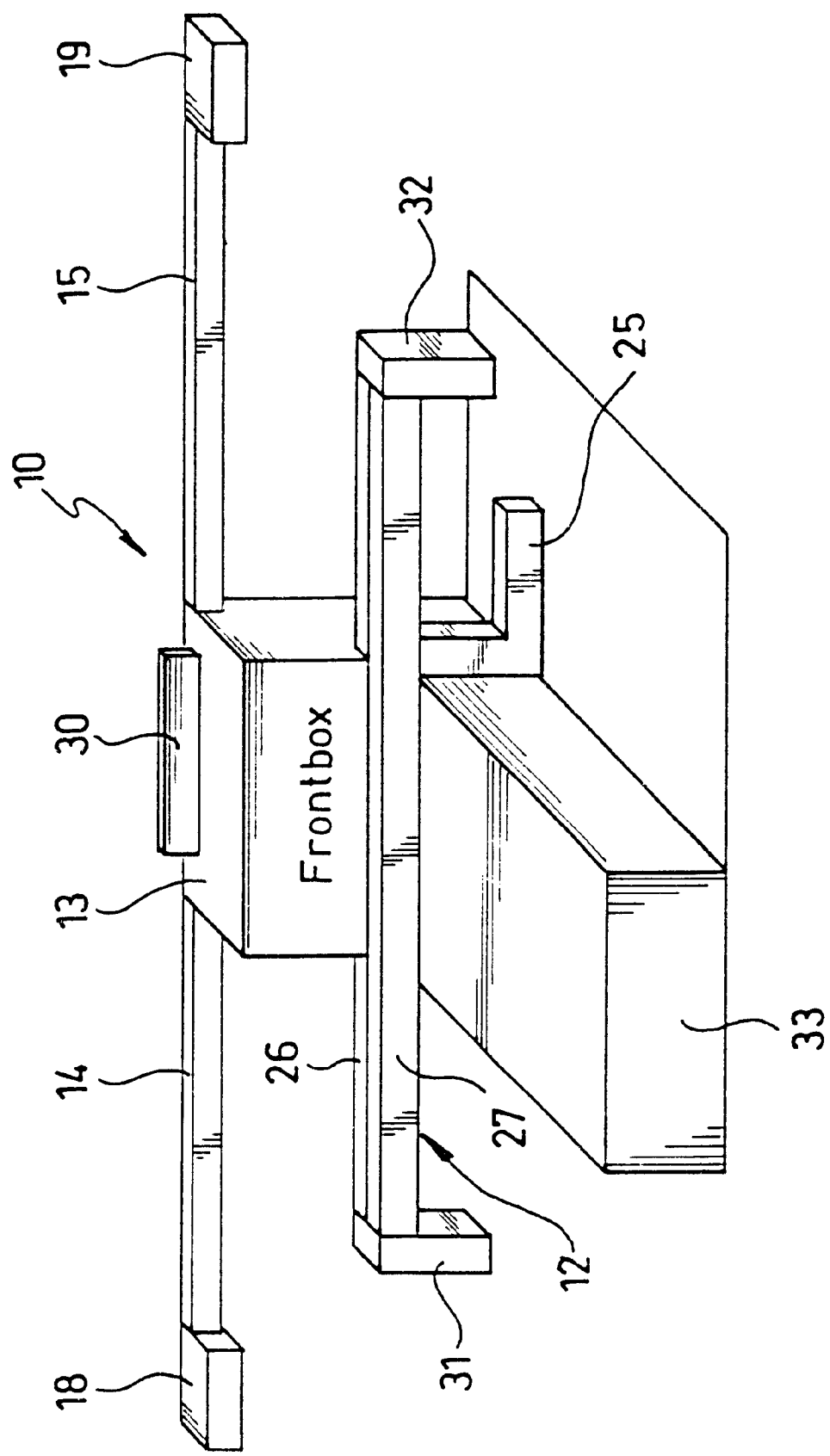
FIG. 2 is a perspective view of an embodiment of the arrangement from FIG. 1 for heating the interior of a commercial vehicle, for example, a bus.

FIG. 2 shows the arrangement which is shown schematically in FIG. 1 in greater detail as applied to the interior of a commercial vehicle, for example, a bus, which has a center tunnel 33 on which the ventilation means 10 is built in the interior on the front face. The housing 13 of the ventilation means 10 has the shape of a front box which contains the motor vehicle fan and also optionally components of an air conditioning system. On the lower end, this front box also has an intake area from which the fan located in the front box takes in air and discharges it via discharge nozzles, of which the discharge nozzle 18 and the discharge nozzle 19 of the system from FIG. 1 are shown. Otherwise, for the same parts as in FIG. 1, the same reference numbers are used. On the front box, there is additionally a defroster nozzle 30 which is used to thaw or defrost the windshield of the motor vehicle.

The fresh air intake chamber 26 as shown in FIG. 1, in the embodiment from FIG. 2, is formed by an air intake channel which runs through the motor vehicle interior. The face-side openings of the air intake channel are connected to the face-side connection openings of the warm air intake chamber 27, which is likewise made in a channel shape. Optional flap means are provided in the mixing channels 31 and 32 for adjusting the mixing ratio of fresh air and warm air which is supplied from the heating device (which is not shown in FIG. 2) by means of the warm air line 25 of the warm air intake chamber 27 from the bottom in the area of the center tunnel. Operation with respect to the delivery of warm air by intake of warm air via the fresh air intake area is the same in this embodiment as in FIG. 1.

Figure 3:
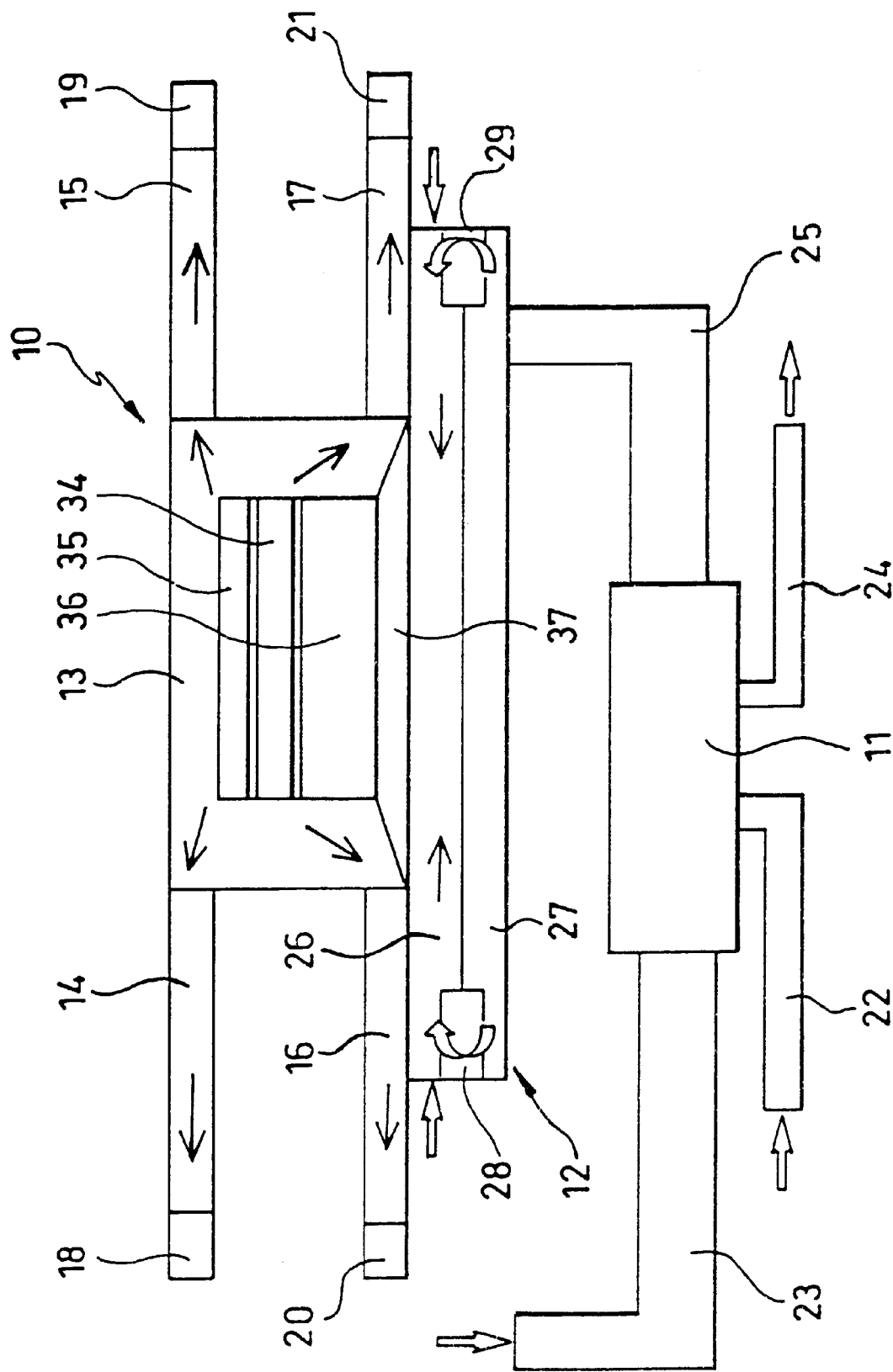
FIG. 3 is a view similar to that of FIG. 1, showing a modified version of the arrangement in accordance with the invention.

In the version shown in FIG. 3, in addition, in the housing 13 which is used as the motor vehicle air guide on the pressure side of the motor vehicle fan 36, there are a first heat exchanger 34 and a second heat exchanger 35. In the embodiment shown, the cooling water of the motor vehicle engine flows through the heat exchanger 34 and the latter thus optionally enables additional heating of air before entering the motor vehicle interior via the connection channels 14 to 17. However, the heat exchanger 34 can also be replaced by another heat source, for example, an electrical heating device so that, for example, a heat shortage of the heating device 11 can be compensated.

The heat exchanger 35 is made, for example, as the evaporator of an air conditioning systems and enables cooling of the air before relaying it into the motor vehicle interior. The heat exchanger 34 and the evaporator 35 can also be arranged in the reverse sequence on the pressure side, or also on the intake side of the motor vehicle fan 36, so that first the cooling of the air for dehumidification with subsequent reheating becomes possible (reheat operation).

What is claimed is:

1. Arrangement for heating a motor vehicle interior, comprising a ventilation means for taking in fresh air via a fresh air intake area and for discharging air into the motor vehicle interior, said ventilation means having an air circulation device with an upstream intake side and a downstream pressure side at which said fresh air intake area is located, a heating device for heating air, and a warm air line for routing the air which has been heated by the heating device into the ventilation means; wherein the warm air line is routed into the fresh air intake area such that the heated air emerging from the warm air line is taken into the ventilation means jointly with fresh air taken in by the ventilation means.

2. Arrangement as claimed in claim 1, wherein a warm/fresh air mixing means is connected upstream of the intake area of the ventilation means.

3. Arrangement for heating a motor vehicle interior, comprising a ventilation means for taking in fresh air via a fresh air intake area and for discharging air into the motor vehicle interior, a heating device for heating air, and a warm air line for routing the air which has been heated by the heating device into the ventilation means; wherein the warm air line is routed into the fresh air intake area such that the heated air emerging from the warm air line is taken into the ventilation means jointly with fresh air taken in by the ventilation means; wherein a warm/fresh air mixing means is connected upstream of the intake area of the ventilation means; and wherein the mixing means comprises a fresh air intake chamber with at least one fresh air intake opening and a warm air intake chamber into which the warm air line discharges and which is connected to the fresh air intake chamber via at least one connection opening having an adjustable opening cross section.

4. Arrangement for heating a motor vehicle interior, comprising a ventilation means for taking in fresh air via a fresh air intake area and for discharging air into the motor vehicle interior, a heating device for heating air, and a warm air line for routing the air which has been heated by the heating device into the ventilation means; wherein the warm air line is routed into the fresh air intake area such that the heated air emerging from the warm air line is taken into the ventilation means jointly with fresh air taken in by the ventilation means; and wherein the intake area is formed by the intake side of a motor vehicle fan.

5. Arrangement as claimed in claim 4, wherein a heat exchanger is connected at the pressure side the motor vehicle fan.

6. Arrangement as claimed in claim 5, wherein coolant of a motor vehicle engine flows through the heat exchanger.

7. Arrangement as claimed in claim 5, wherein a second heat exchanger is connected at the pressure side of motor vehicle fan.

8. Arrangement as claimed in claim 7, wherein the second heat exchanger is an evaporator of an air conditioning system.

* * * * *